United States Patent
Lavender

(10) Patent No.: US 12,332,081 B2
(45) Date of Patent: Jun. 17, 2025

(54) METHOD AND DEVICE FOR REMOTELY MEASURING GROUND SLOPE

(71) Applicant: Gerry Rodney Lavender, San Antonio, TX (US)

(72) Inventor: Gerry Rodney Lavender, San Antonio, TX (US)

(*) Notice: Subject to any disclaimer, the term of this patent is extended or adjusted under 35 U.S.C. 154(b) by 0 days.

(21) Appl. No.: 18/110,575

(22) Filed: Feb. 16, 2023

(65) Prior Publication Data
US 2024/0280363 A1    Aug. 22, 2024

(51) Int. Cl.
*G01C 9/06*     (2006.01)
*G01S 17/08*    (2006.01)

(52) U.S. Cl.
CPC ......... *G01C 9/06* (2013.01); *G01C 2009/066* (2013.01); *G01S 17/08* (2013.01)

(58) Field of Classification Search
CPC ...... G01C 9/06; G01C 2009/066; G01S 17/08
See application file for complete search history.

(56) References Cited

U.S. PATENT DOCUMENTS

| | | | |
|---|---|---|---|
| 2019/0154439 A1* | 5/2019 | Binder | G01B 11/26 |
| 2022/0046228 A1* | 2/2022 | Haskin | H04N 17/002 |
| 2022/0254658 A1* | 8/2022 | Fukui | H01L 21/67742 |
| 2023/0069309 A1* | 3/2023 | Nishi | E04G 21/16 |
| 2023/0196601 A1* | 6/2023 | Habib | G06V 10/80 |
| | | | 382/100 |

* cited by examiner

*Primary Examiner* — Isam A Alsomiri
*Assistant Examiner* — Joseph C Fritchman
(74) *Attorney, Agent, or Firm* — Phillip Black; Dorsey & Jones PLC

(57) ABSTRACT

A device for measuring a slope of a surface includes a tilt sensor, two or more distance sensors coupled to the tilt sensor, and a processor configured for calculating the slope of the surface based on measurements provided by the tilt sensor and the distance sensors. The distance sensors are coupled to the tilt sensor at a non-parallel angle relative to each other. In one example, the angle between the distance sensors may be between 30 and 120 degrees. The tilt sensor may be an inclinometer. The distance sensors may be laser distance sensors, LED time-of-flight sensors, or IR distance sensors. The device is compact, portable, and small enough to be held in a user's hand.

17 Claims, 13 Drawing Sheets

METHOD AND DEVICE FOR REMOTELY MEASURING GROUND SLOPE

BACKGROUND

Field of the Art

This disclosure relates to a device and methods for remotely measuring the slope of a surface. In particular, the device is a compact handheld device configured for measuring the slope of a surface (such as a ground surface) below the device.

Discussion of the State of the Art

There are common measurement devices available for measuring the slope of a surface, but they have to be positioned in a stationary location, have to contact the surface, have to be held perfectly level, are too cumbersome, and/or are prohibitively expensive. Interferometers are expensive, need to be stationary, and require mirrors around the surface being measured. Direct surface angle measurement with an inclinometer requires contact with the surface.

In one example, a method for remotely measuring a surface slope may include using a device similar to a depth finder to measure a distance to the surface at two or more different points. Using the difference between the two distances and the horizontal difference between the two points, the slope between the two points can be determined. However, this method would be cumbersome and would require precise measurements to get an accurate result.

In another example, shown in FIG. 1, a beam mounted device may be used to measure the surface angle from a fixed position above a ground surface 110. As shown in FIG. 1, two distance sensors, 102 and 104, are aligned vertically, are separated by horizontal distance 108, and are mounted on a horizontal beam 106. The horizontal beam 106 must be perfectly horizontal, having a zero degrees slope. The two vertical distance sensors, 102 and 104, measure two distances, 112 and 114, respectively, to the surface 110 directly below. The slope angle 120 of the surface 110 can then be calculated using the difference 116 between the two distances 112, 114 and the separation distance 108.

The method shown in FIG. 1 is disadvantageous for several reasons. First, the distance sensors 102, 104 must be mounted on a perfectly horizontal beam 106. Second, in order to get an accurate measurement of the slope angle 120, the distance sensors 102, 104 need to have a fairly significant horizontal distance 108 between them. In other words, if the distance sensors 102, 104 are positioned too close together, the slope angle measurement would not be very reliable, especially if the slope angle 120 is relatively small. As such, the method depicted in FIG. 1 takes a long time, requires a lot of space, and is therefore too cumbersome.

There is a need for a slope angle measurement device that is small, portable, handheld, fast, inexpensive, and accurate. Such a device would be beneficial to use during a golf game, for example. In another example, such a device may be used in a flying vehicle or a drone to provide a way to determine whether the ground is level enough for landing. Such a device may also be used to determine if a wall or similar vertical surface is perpendicular or at what angle it is to the closest point on the wall.

SUMMARY

A slope angle measurement device in accordance with the present invention includes two or more distance sensors and a tilt sensor, such as an inclinometer. The distance sensors are positioned at a wide angle relative to each other. In particular, the angle between the distance sensors is at least 30 degrees. The device is compact, handheld, quick and accurate. Further, the device does not have to be mounted to a tripod and can be operated while being held in the user's hand.

In one example, the device for measuring the slope of a surface includes a tilt sensor. The tilt sensor may be an inclinometer or accelerometer. The device further includes two or more distance sensors coupled to the tilt sensor. The distance sensors may be coupled to the tilt sensor at an angle relative to each other. The angle between the distance sensors is greater than zero. The angle between the distance sensors may be between 30 and 120 degrees. Still further, the angle between the distance sensors may be between 40 and 70 degrees. The distance sensors may be laser distance sensors, LED time-of-flight sensors, or IR distance sensors.

Still further, the measurement device includes a processor configured for calculating the slope of the surface based on measurements provided by the tilt sensor and the distance sensors. The device may also include a display configured for displaying the slope calculated by the processor. The device may be sized and shaped to be held in a user's hand.

In one example, the device may include three or more distance sensors. The device may further include a three-axis magnetometer. The tilt sensor may be a three-axis accelerometer.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
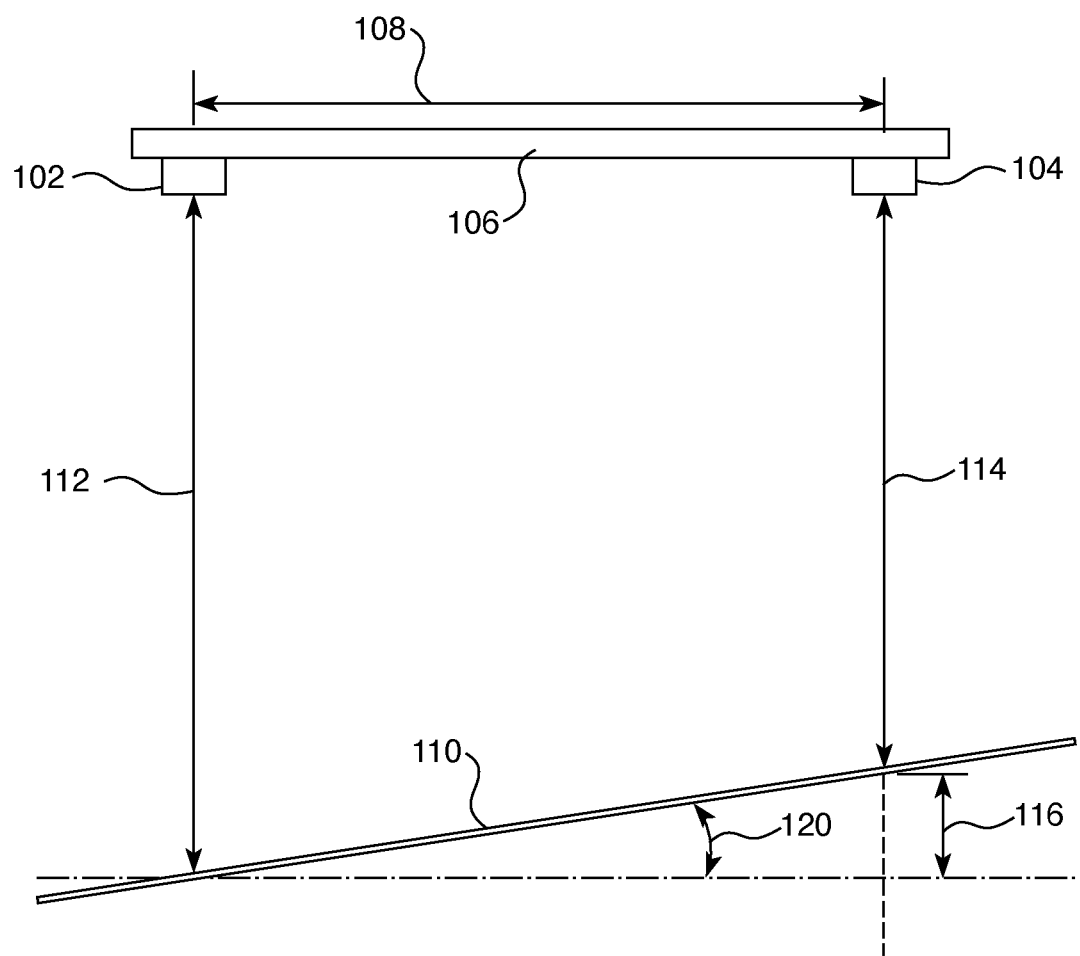
FIG. 1 illustrates a conventional method for measuring a slope angle of a surface.

A slope angle measurement device in accordance with the present invention includes at least two distance sensors coupled to a tilt sensor, such as an accelerometer. The accelerometer may be an inclinometer. The angle between the distance sensors is greater than zero, and is at least 30 degrees. The slope angle measurement device is configured to quickly and accurately calculate the slope angle of a surface below the device. For example, the device may be used to calculate the slope angle of a ground surface on a golf course. The device may also be used to calculate the slope of a vertical surface, such as a wall. The device is advantageously small and portable so that the device can be held in a user's hand.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention is a slope angle measuring device that is compact and portable. The device includes at least two distance sensors positioned at a non-parallel angle relative to each other. In one example, the angle between the two distance sensors is between 30 and 120 degrees. The two distance sensors are coupled to a tilt sensor, such as an accelerometer or inclinometer.

Apparatus

Figure 2A:
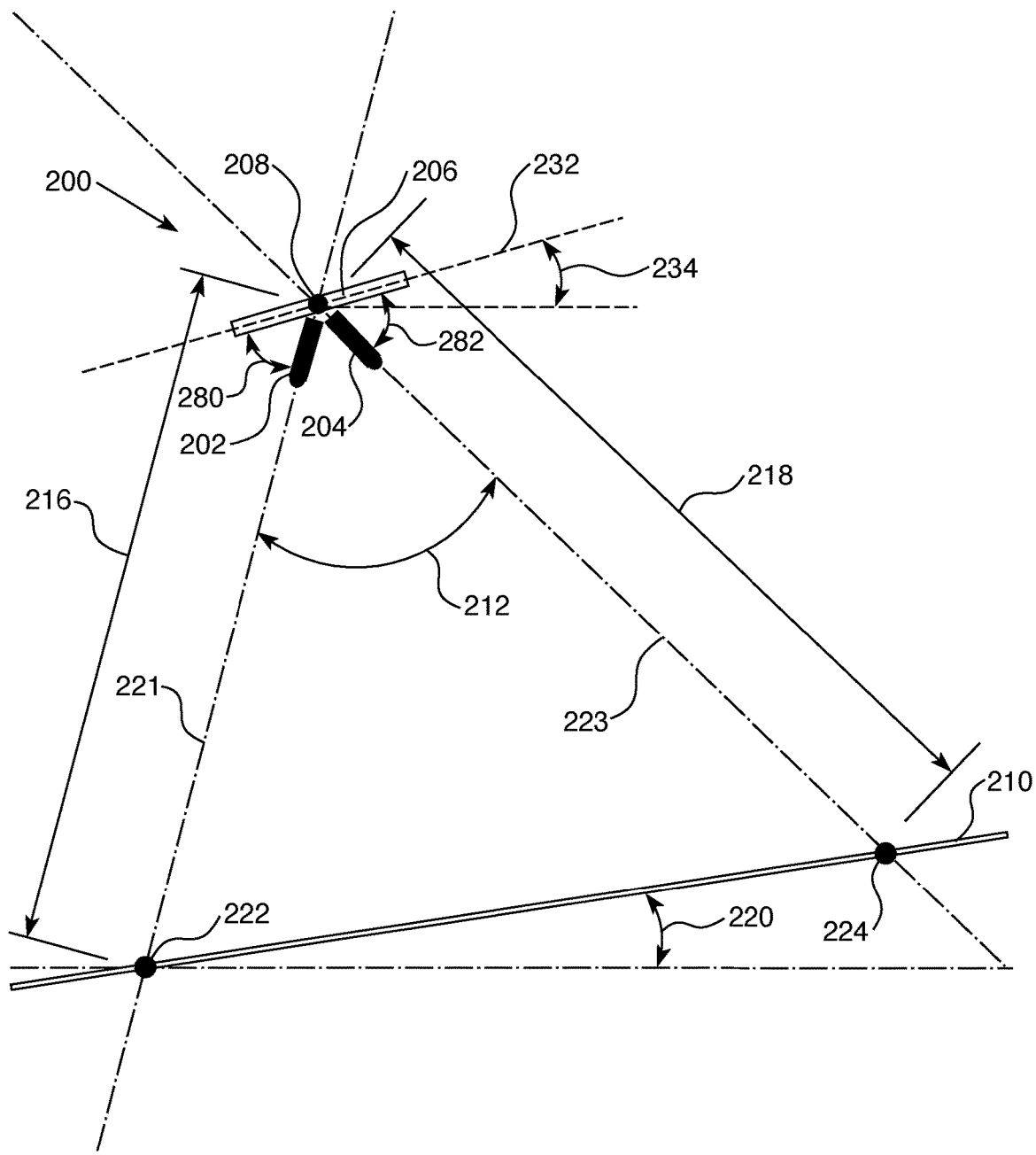
FIGS. 2A and 2B illustrate a method for measuring a slope angle of a surface using a slope angle measuring device having two distance sensors, in accordance with one embodiment of the present invention.

FIG. 2A depicts a slope angle measuring device 200 being used to measure the slope angle 220 of a ground surface 210. The device 200 includes a first distance sensor 202 and a second distance sensor 204. The device further includes an accelerometer 206 coupled to the distance sensors 202, 204 in a fixed manner. The distance sensors 202, 204 extend from a center point 208 of the device 200 and are positioned at an angle 212 relative to each other. The angle 212 is greater than zero. The angle 212 may be a wide angle for some applications. In one example, the angle 212 is between 30 and 120 degrees. In another example, the angle 212 is between 30 and 90 degrees. In yet another example, the angle 212 is between 50 and 70 degrees. The first distance sensor 202 is at a first angle 280 relative to the accelerometer 206, and the second distance sensor 204 is at a second angle 282 relative to the accelerometer 206. The angles 280, 282, and 212 add up to 180. Although the distance sensors 202, 204 are shown to be pointing away from each other, the distance sensors 202, 204 may alternatively be pointing towards each other. The device 200 is not limited to the configuration shown in FIG. 2A and the distance sensors 202, 204 may be at any non-zero angle relative to each other.

The angles 280, 282, and 212 may be fixed or may be adjustable. In general, the closer the device 200 is to the ground surface 210, the greater the angle 212 should be in order to obtain an accurate measurement. For example, if the device 200 is positioned about 30 inches above the ground surface 210, the angle 212 is preferably 30 degrees or greater. If the device 200 is positioned about 100 feet above the ground surface 210, the angle 212 may be as small as 3 degrees. As such, the angle 212 between the distance sensors 202, 204 depends on the distance between the device 200 and the ground surface 210 and may be any angle greater than zero. In other words, the distance sensors 202, 204 are not parallel to each other. A general guideline for determining the preferred angle 212 is as follows:

(distance between device 200 and ground surface 210) − (cos (angle 212) *

(distance between device 200 and ground surface 210) > 1 inch

The distance sensor 202 is configured to measure the distance 216 between the center point 208 of the device 200 and the point 222 where the centerline of the distance sensor beam 221 intersects the ground surface 210. Similarly, the distance sensor 204 is configured to measure the distance 218 between the center point 208 of the device 200 and the point 224 where the centerline of the distance sensor beam 223 intersects the ground surface 210. The distance sensors 202, 204 may be any kind of sensor having a transmitter and receiver. For example, the distance sensors 202, 204 may be laser distance sensors, non-contact optical sensors, LED time-of-flight sensors, IR distance sensors, or the like. Although not preferable due to the relatively large size of sound waves, ultrasonic distance sensors could also be used to measure the distances 216, 218.

Figure 5:
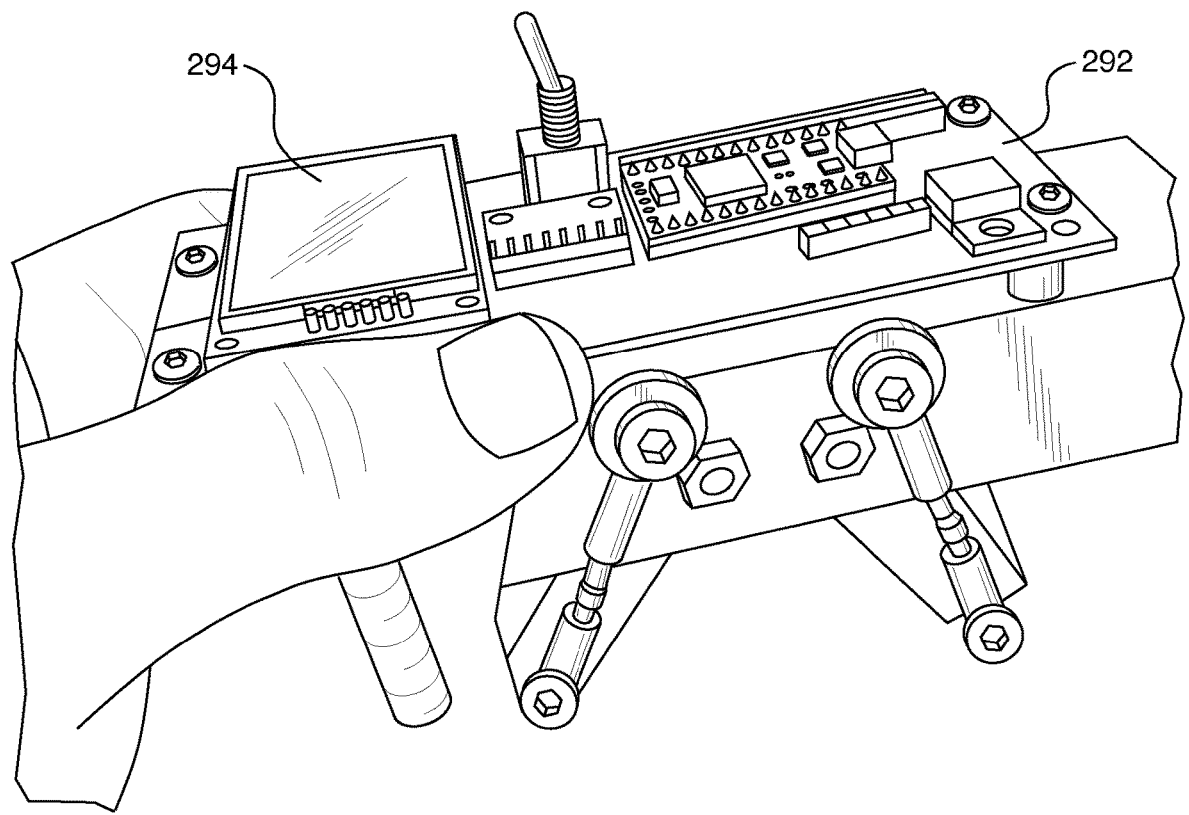
FIG. 5 illustrates a device for measuring a slope angle of a surface, in accordance with one embodiment of the present invention.

The accelerometer 206 is preferably an inclinometer that measures the angle 234 of the longitudinal axis 232 of the accelerometer 206 relative to horizontal. The device 200 further includes a processor 292 and a display screen 294 (shown in FIG. 5). Using the measured values of the first distance 216, the second distance 218, the angle 234, and the known value of the angle 212, the device processor 292 is configured to calculate the slope angle 220 of the ground surface 210. This calculation is explained in greater detail below. Notably, the calculation used in this example is exemplary only. The invention is not limited to the below method of performing the calculation. Rather, any method may be used to calculate the ground slope using the measurements provided by the device 200. The display screen 294 is configured to display the calculated result to the user. However, the invention is not limited to having a display screen for output purposes. Rather, the output of the device 200 may be accomplished by other means. For example, the slope angle calculated by the device 200 may be wirelessly transmitted to a mobile device.

Figure 6:
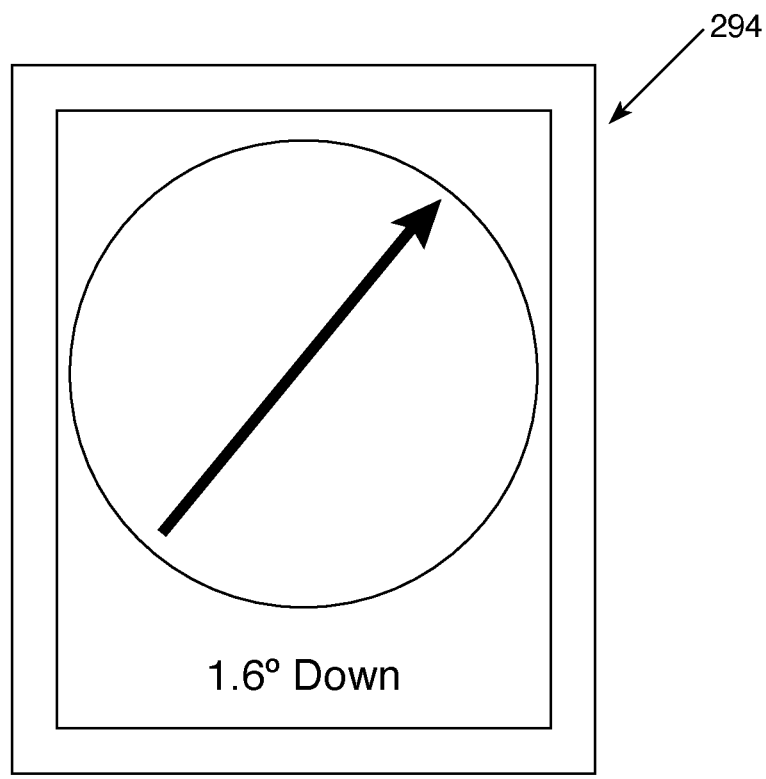
FIG. 6 illustrates an example of a display screen of a device for measuring a slope angle of a surface, in accordance with one embodiment of the present invention.
Figure 7:
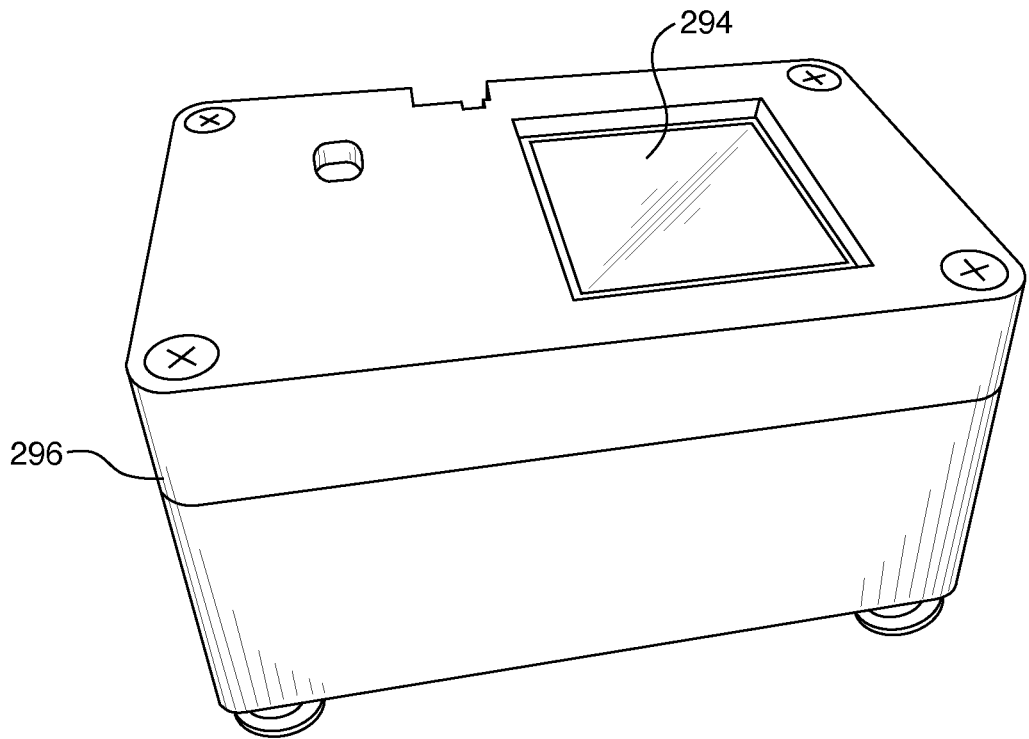
FIG. 7 illustrates a housing and a display screen of a device for measuring a slope angle of a surface, in accordance with one embodiment of the present invention.

Another example of the information displayed on the display screen 294 is shown in FIG. 6. FIG. 7 depicts the housing 296 for the device 200 and the display screen 294. The circuitry and power source of the device 200 may be positioned within the housing 296.

Figure 2B:
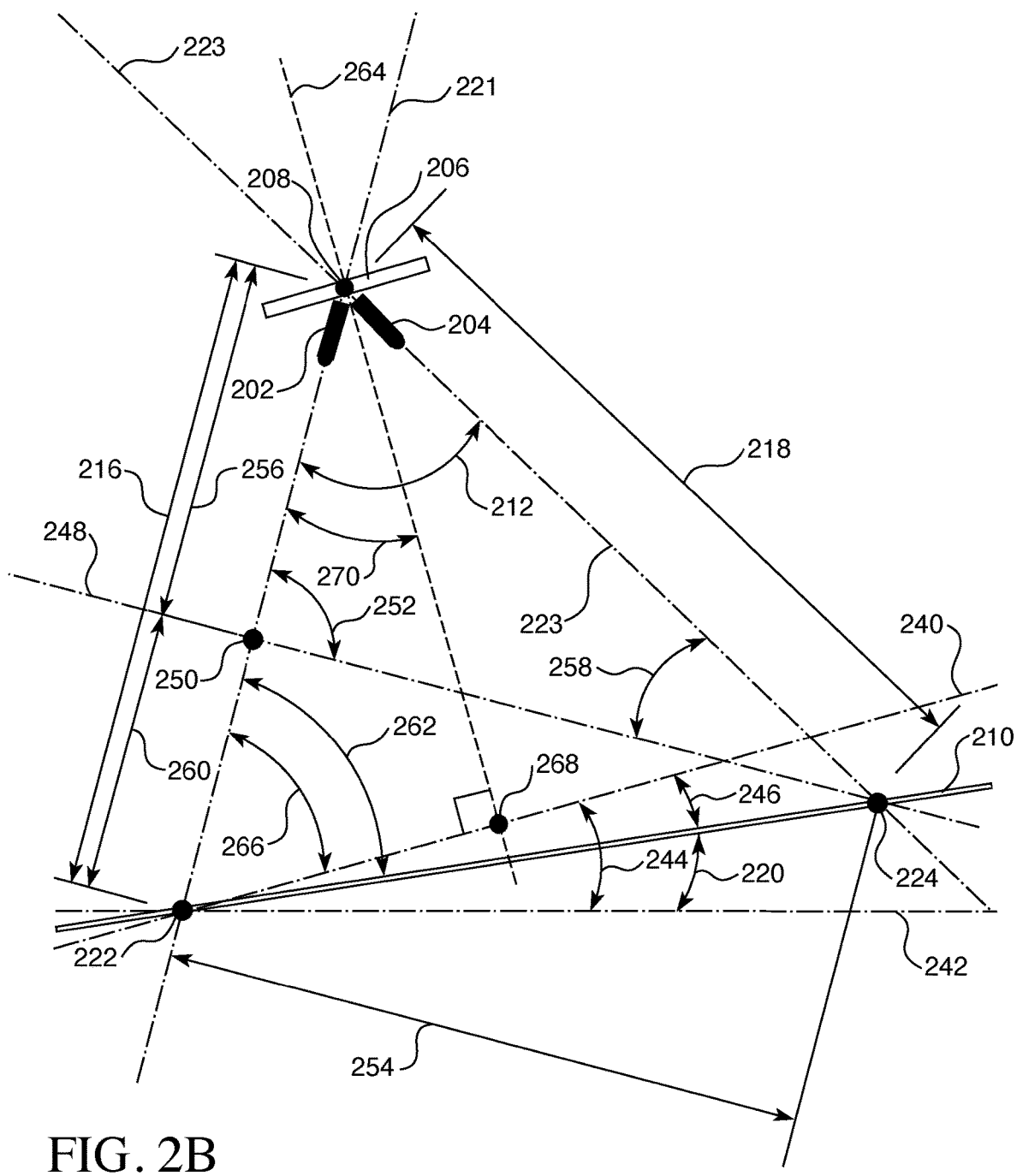

Referring now to FIG. 2B, the calculation of the slope angle 220 will be explained in greater detail. Line 240 is parallel to the longitudinal axis 232 (see FIG. 2A) of the accelerometer 206. Line 242 is horizontal. As such, angle 244 is equal to the angle 234 (depicted in FIG. 2A) of the longitudinal axis 232 of the accelerometer 206 relative to horizontal. The ground slope angle 220 plus the angle 246 calculated by the device 200 is equal to the angle 244. A line 248 is perpendicular to the beam 221. As such, angle 252 is 90 degrees. The line 248 intersects the beam 221 at point 250 and intersects the beam 223 and the ground surface 210 at point 224. The distance 256 is the distance between point 250 and the center point 208 of the device 200. The distance 254 is the distance between point 250 and point 224. Point 224, point 250, and point 208 form a right triangle where angle 252 is 90 degrees. There are 180 degrees in a triangle. Angle 258 can be solved for:

$$\text{angle } 258 = 180 - \text{angle } 252 - \text{angle } 212 \qquad \text{equation 1}$$

$$\text{angle } 258 = 180 - 90 - \text{angle } 212$$

$$\text{angle } 258 = 90 - \text{angle } 212$$

Since Point 224, point 250, and point 208 form a right triangle, distance 256 and distance 254 can be calculated using trigonometry:

$$\text{distance } 256 = \sin(\text{angle } 258) * \text{distance } 218 \qquad \text{equation 2}$$

$$\text{distance } 254 = \cos(\text{angle } 258) * \text{distance } 218 \qquad \text{equation 3}$$

Substitute right side of equation 1 for angle 258:

$$\text{distance } 256 = \sin(90 - \text{angle } 212) * \text{distance } 218 \qquad \text{equation 4}$$

$$\text{distance } 254 = \cos(90 - \text{angle } 212) * \text{distance } 218 \qquad \text{equation 5}$$

Distance 260 is the distance between point 250 and point 222.

$$\text{distance } 216 = \text{distance } 256 + \text{distance } 260 \qquad \text{equation 6}$$

Solving for distance 260:

$$\text{distance } 260 = \text{distance } 216 - \text{distance } 256 \qquad \text{equation 7}$$

Substitute right side of equation 4 for distance 256 in equation 7:

$$\text{distance } 260 = \qquad \text{equation 8}$$
$$\text{distance } 216 - (\sin(90 - \text{angle } 212) * \text{distance } 218)$$

Distance sensor beam 221 and ground surface 210 form angle 262. Point 224, point 250, and point 222 form a right triangle. Using trigonometry to solve for angle 262:

$$\tan(\text{angle } 262) = \text{distance } 254/\text{distance } 260 \qquad \text{equation 9}$$

$$\text{angle } 262 = \arctan(\text{distance } 254/\text{distance } 260) \qquad \text{equation 10}$$

Substitute right side of equation 5 for distance 254 and right side of equation 8 for distance 260:

$$\text{angle } 262 = \arctan((\cos(90 - \text{angle } 212) * \text{distance } 218)/(\text{distance } 216 - (\sin(90 - \text{angle } 212) * \text{distance } 218))) \quad \text{equation 11}$$

Line 240 is perpendicular to line 264 at point 268 and intersects distance sensor beam 221 at point 222 forming angle 266. Point 222, point 268, and point 208 form a right triangle. Since there are 180 degrees in a triangle:

$$\text{angle } 266 = 180 - 90 - \text{angle } 270 \quad \text{equation 12}$$
$$\text{angle } 266 = 90 - \text{angle } 270$$

Angle 262 is the sum of angle 266 plus angle 246. Solve for angle 246 and substitute the value for angle 266 from equation 12:

$$\text{angle } 246 = \text{angle } 262 - \text{angle } 266 \quad \text{equation 13}$$
$$= \text{angle } 262 - 90 + \text{angle } 270$$

The surface slope angle 220 is the difference between the inclinometer accelerometer angle 244 and the distance sensor calculated angle 246 (angle 246 can be positive or negative depending on held angle 244 and surface slope angle 220).

$$\text{angle } 220 = \text{angle } 244 - \text{angle } 246 \quad \text{equation 14}$$

Substitute right side of equation 13 for angle 246:

$$\text{angle } 220 = \text{angle } 244 - \text{angle } 262 + 90 - \text{angle } 270 \quad \text{equation 15}$$

Substitute right side of equation 11 for angle 262:

$$\text{angle } 220 = \text{angle } 244 - \arctan((\cos(90 - \text{angle } 212) * \text{distance } 218)/(\text{distance } 216 - (\sin(90 - \text{angle } 212) * \text{distance } 218))) + 90 - \text{angle } 270 \quad \text{equation 16}$$

In this example, angles 280 and 282 (shown in FIG. 2A) are equal to each other, so angle 270 is half of angle 212.

$$\text{angle } 220 = \text{angle } 244 - \arctan((\cos(90 - \text{angle } 212) * \text{distance } 218)/(\text{distance } 216 - (\sin(90 - \text{angle } 212) * \text{distance } 218))) + 90 - \frac{1}{2}(\text{angle } 212) \quad \text{equation 17}$$

The above equation 17 is one example of an equation that may be used to calculate the surface slope angle 220. Angle 244 is provided by the accelerometer 206, angle 212 is a known value, distance 216 is provided by the first distance sensor 202, and distance 218 is provided by the second distance sensor 204.

In another example, the device 200 is configured to display a ground slope angle when the two distances 216 and 218 are equal. In other words, when the longitudinal axis 232 of the accelerometer 206 is parallel to the ground slope 210, the accelerometer angle is substantially equal to the angle of the ground slope between points 222 and 224. In this example, the user would tilt the device 200 until the device 200 provided an indication that the distances 216 and 218 are equal. When the distances 216 and 218 are equal, the device 200 would then output the measured angle of the accelerometer, which is substantially equal to the angle of the ground slope 210.

Figure 8:
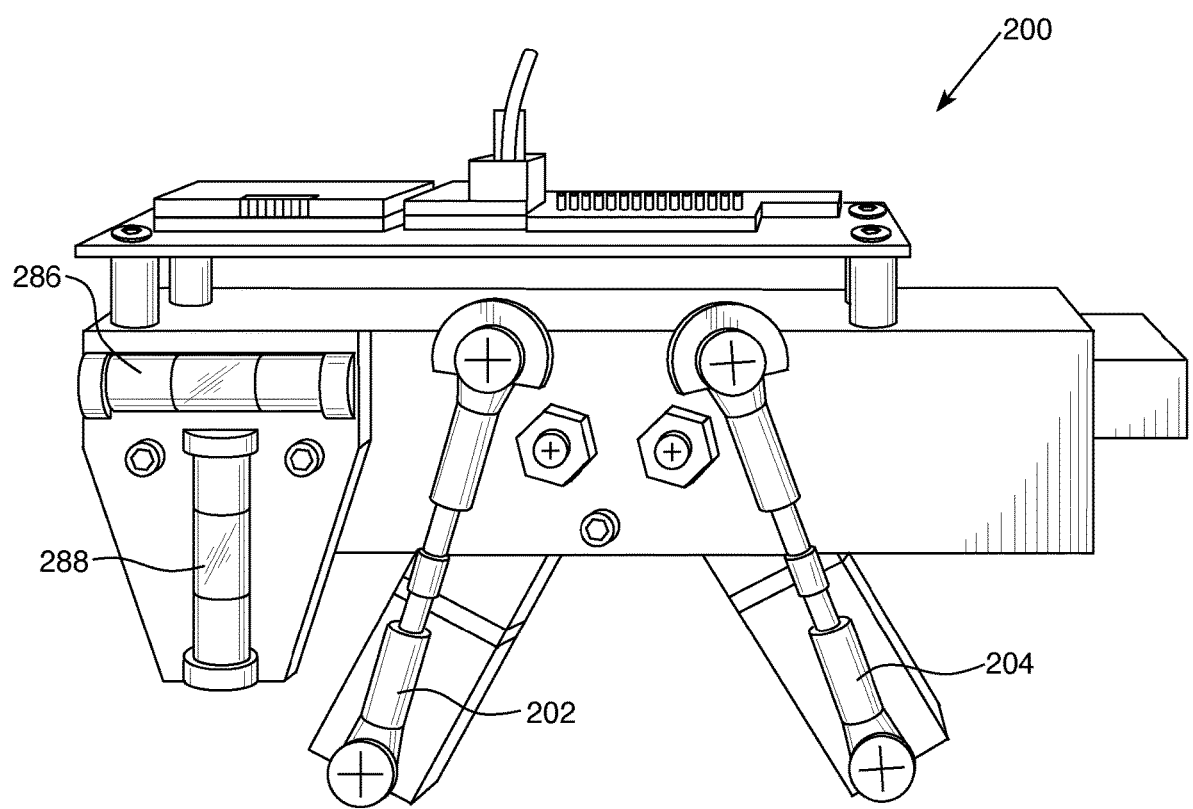
FIG. 8 illustrates a device for measuring a slope angle of a surface, in accordance with one embodiment of the present invention.

Other tilt sensors or tilt indicators may be used in the slope measuring device 200. For example, as shown in FIG. 8, the device 200 includes levels 286, 288 rather than an accelerometer. The levels 286, 288 are used to determine when the device 200 is perfectly horizontal and vertical. In other words, the levels 286, 288 indicate when the angle 244 (shown in FIG. 2B) is zero. When the device 200 is perfectly level, as indicated by the levels 286, 288, the slope angle 220 can be calculated by the processor. It will be well understood that any type of level may be used and that this example is not limited to bubble levels as shown in FIG. 8. Further, it will be well understood that any other kind of tilt sensor may be used in place of the accelerometer, inclinometer, or levels.

The device 200 has been found to have good resolution for measurement of the slope on a surface like a golf green. The device 200 is compact and easily held in the user's hand. As such, the device 200 is advantageous over a bulky parallel distance sensor device, such as that depicted in FIG. 1.

Figure 3A:
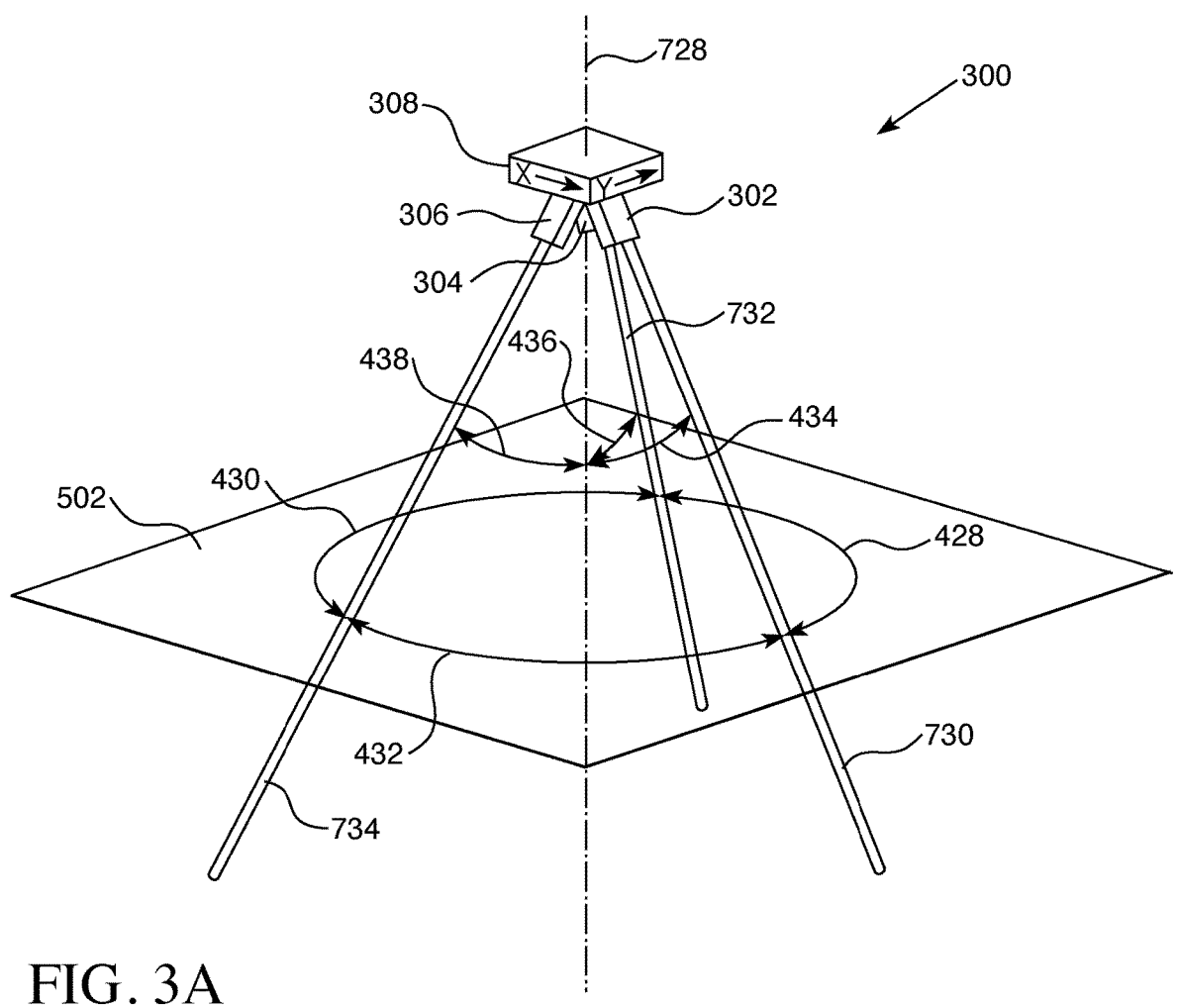
FIGS. 3A-3F illustrate a method for measuring a slope angle of a surface using a slope angle measuring device having three distance sensors, in accordance with one embodiment of the present invention.

FIG. 3A illustrates a ground slope measuring device 300 that includes three distance sensors 302, 304, 306 and a three-axis accelerometer 308. The device 300 is not limited to three distance sensors and may include 4 or more distance sensors. A line 728 passes through the center of the device 300 and is perpendicular to the x-y plane of the accelerometer 308. Each distance sensor 302, 304, 306 emits a beam 730, 732, 734, respectively. The angles 434, 436, 438, respectively, between the beams 730, 732, 734 and the center line 728 are substantially equal to each other. Each one of the angles 434, 436, 438 is at least 30 degrees. More specifically, each one of the angles 434, 436, 438 is between 30 and 90 degrees. Still further, each one of the angles 434, 436, 438 may be between 40 and 70 degrees. Plane 502 is an imaginary plane that is parallel to the x-y plane of the accelerometer 308.

Figure 3B:
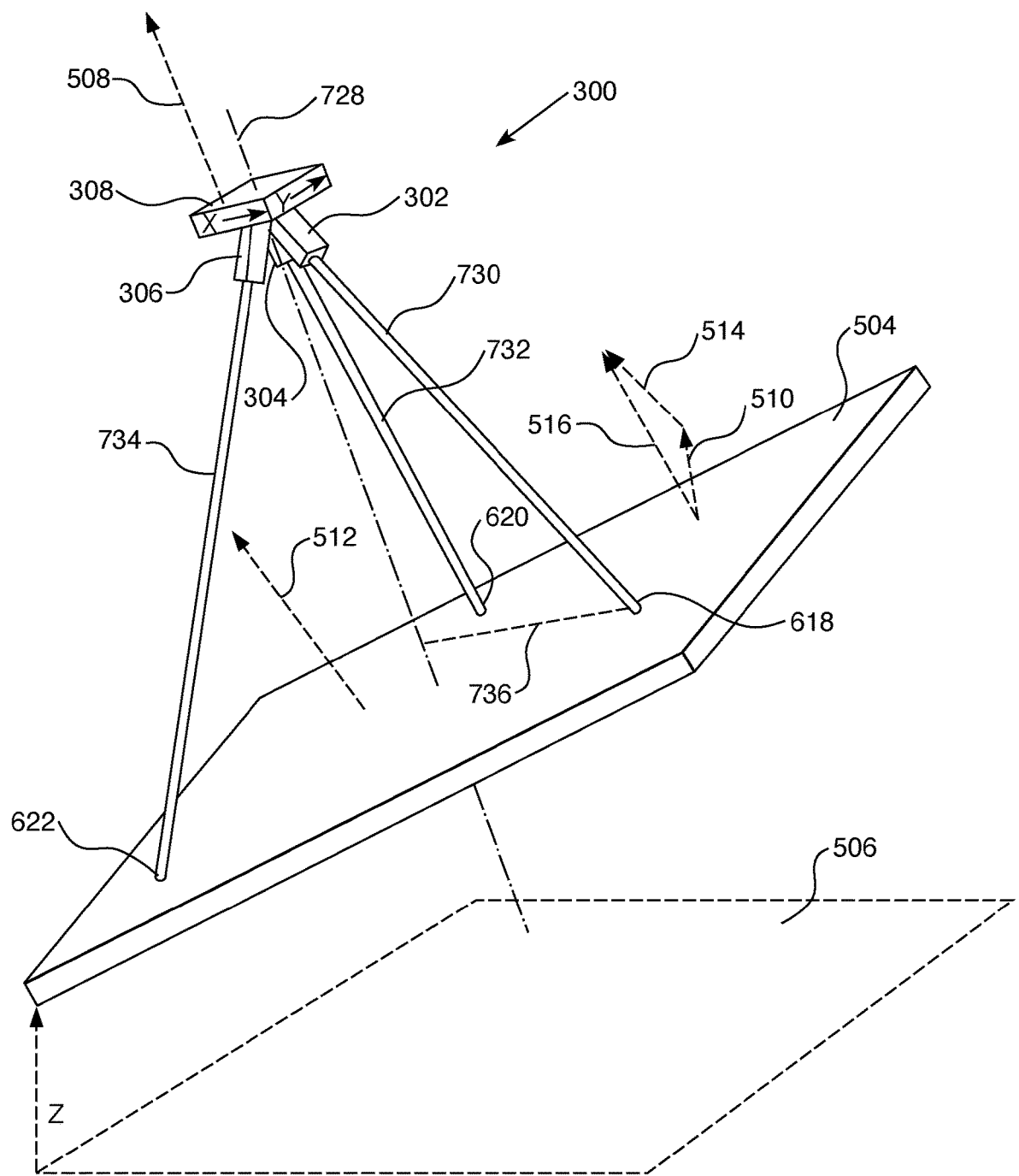

The ground slope measuring device 300 is configured to measure the slope of a plane, such as plane 504 depicted in FIG. 3B. One example of the calculation of the ground slope angle is explained in greater detail with reference to FIGS. 3B-3F. Distance sensor 302 will be assumed to be the front of the device 300 and will be on the x-axis of the x-y plane of the device 300. Plane 502 is an imaginary plane parallel to the x-y plane of the accelerometer 308 to show the angle layout of the distance sensor beams 730, 732, 734. In this example, for simplicity, all three distance sensors 302, 304, 306 are at equal aiming angles 434, 436, 438 from centerline 728 which is also the z-axis of the accelerometer 308. However, it should be well understood by one of ordinary skill in the art that the invention is not limited to the angles 434, 436, 438 being equal to each other. Alternatively, the angles 434, 436, 438 may not be equal and each angle 434, 436, 438 may be different from the other two. A circle around the centerline 728 having 360 degrees is divided by 3 for 120 degrees horizontally between each distance sensor beam 730, 732, 734. Angle 428 (120 degrees) is between distance sensor beam line 730 and distance sensor beam line 732. Angle 430 (120 degrees) is between distance sensor beam line 732 and distance sensor beam line 734. Angle 432 (120 degrees) is between distance sensor beam line 734 and distance sensor beam line 730.

Vertically, in this example, all three distance sensors 302, 304, 306 are aimed downward at equal vertical aiming angles (434, 436, and 438) of 30 degrees to the device centerline 728. Angle 434 (30 degrees) is between centerline 728 and distance sensor beam line 730. Angle 436 (30 degrees) is between centerline 728 and distance sensor beam line 732. Angle 438 (30 degrees) is between centerline 728 and distance sensor beam line 734.

In FIG. 3B the distance sensors 302, 304, 306 are aimed at wide angles described above to measure distances to three points 618, 620, 622, respectively, on the surface plane 504 below. The slope (that is, the normal vector) of the surface plane 504 relative to the level horizontal plane 506 can be calculated in three dimensions.

For simplicity, the horizontal direction of distance sensor 302 (the front of the device), relative to the device 300 itself, will be assumed to be the x-axis of the distance sensor array. Line 736 runs perpendicular from the centerline 728 to the distance sensor beam 730 at point 618 on plane 504. As such, line 736 is parallel to the x-axis of the accelerometer 308. That is, line 736 is parallel to the x-axis of the device 300, which includes the accelerometer 308 and the distance sensors 302, 304, 306. To pin down the reference for measurements, the device front will be assumed to be towards laser beam line 730 along line 736. Plane 506 is an imaginary level surface (X-Y plane).

The slope of the surface 504 will be determined in relation to the direction the device 300 is pointed, which is down the device x-axis. The device 300 may be used for measuring the surface slope of a golf green, or the like. The end user would not care about the surface slope in relation to True North but would want the surface slope in relation to where the device is aimed. In another example, discussed below, the slope measuring device may be configured to determine the surface slope in relation to True North.

A normal vector 508 is calculated from the three axes output of the accelerometer 308 relative to the horizontal plane 506. A unit vector 510 for vector 508 will then be calculated.

Vector 512, which is the normal vector for the X-Y plane of the device 300 relative to the surface of plane 504 will be calculated from the distance sensors 302, 304, 306. The unit vector 514 for vector 512 will then be calculated. Vector 510 and vector 514 will then be added to give vector 516 which will be the final normal vector for surface plane 504.

First, the three distance sensors 302, 304, 306 will be used to determine three points 618, 620, and 622 on the surface plane 504 relative to the distance sensors 302, 304, 306 of the device 300. The beam from distance sensor 302 along line 730 strikes plane 504 at point 618. The beam from distance sensor 304 along line 732 strikes plane 504 at point 620. The beam from distance sensor 306 along line 734 strikes plane 504 at point 622. The point of measurement for all points will be relative to the center of the device 300.

Figure 3C:
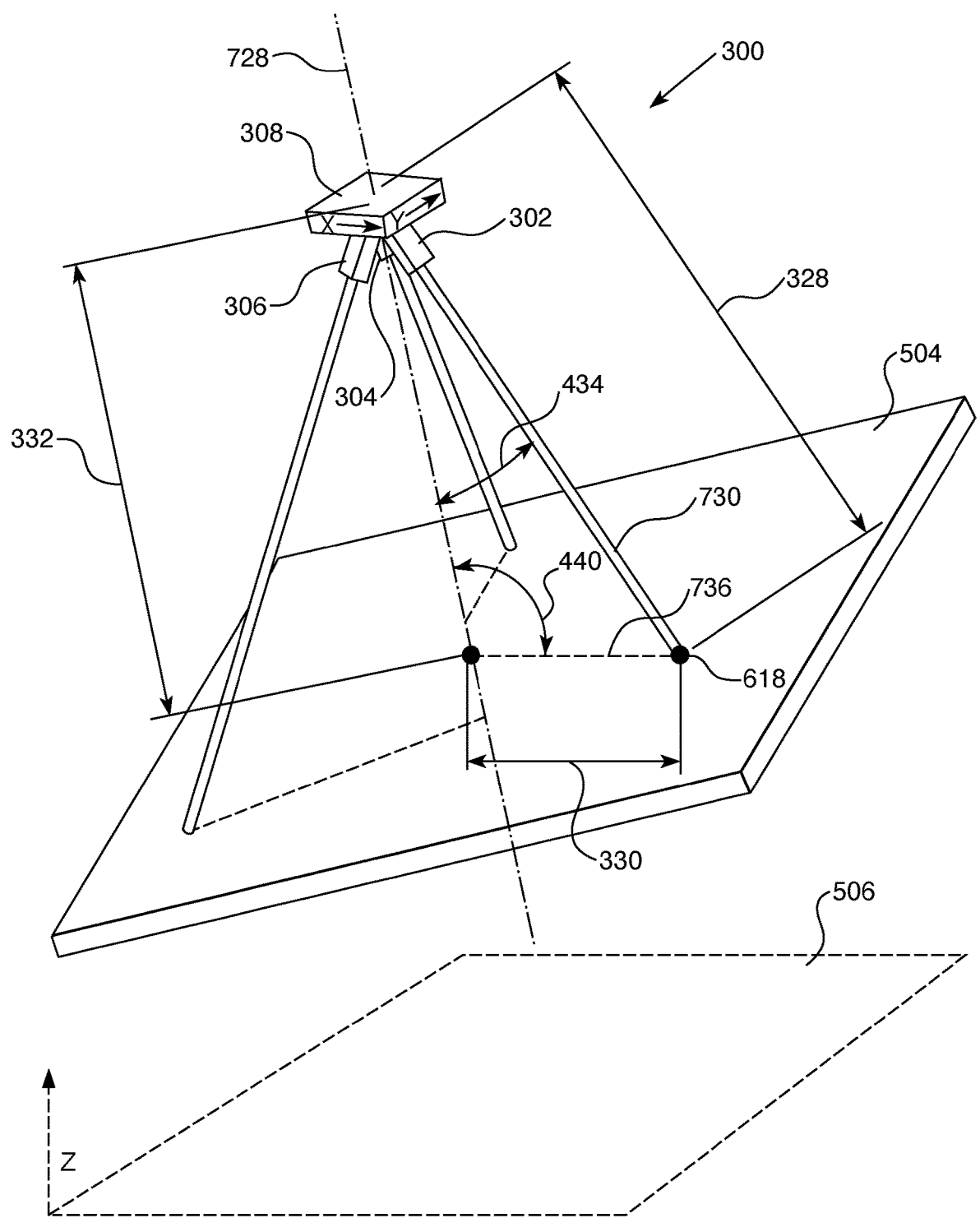

In FIG. 3C, distance 328 is the distance between the device 300 and point 618, as measured by the distance sensor 302. As discussed above, the angle between the distance sensor beam line 730 and the centerline 728 is angle 434 or 30 degrees. Line 736 is parallel to the device x-axis making its angle 0 degrees relative to the device x-y plane. Distance 330 is the distance along line 736 between centerline 728 and point 618. Distance 330 is the x-component of point 618. Distance 332 is the distance along line 728 between the device 300 and line 736.

Since line 736 is perpendicular to centerline 728, angle 440 is 90 degrees. Looking at the right triangle formed by line 736, line 728, and line 730 and knowing the distance 328 measured by distance sensor 302, distance 330 and distance 332 can be calculated as follows.

$$\text{distance } 330 = \sin(\text{angle } 434) * \text{distance } 328 = \quad \text{equation 962}$$

$$\sin(30 \text{ degrees}) * \text{distance } 328 = .5 * \text{distance } 328$$

Since line 736 is at a horizontal angle of 0 degrees, the y-component of point 618 is 0. Distance 332 is the distance along centerline 728 between the device center and line 736. This is the z-component of point 618.

$$\text{distance } 332 = \cos(\text{angle } 434) * \text{distance } 328 = \quad \text{equation 964}$$

$$\cos(30 \text{ degrees}) * \text{distance } 328 = .87 * \text{distance } 328$$

For point 618 (x,y,z): P(distance 330, 0, distance 332)
Substituting values for distance 330 from equation 962 and distance 332 from equation 964, P(0.5*distance 328, 0, 0.87*distance 328)

$$P618x = .5 * \text{distance } 328 \qquad \text{equation 966a}$$
$$P618y = 0 \qquad \text{equation 966b}$$
$$P618z = .866 * \text{distance } 328 \qquad \text{equation 966c}$$

Figure 3D:
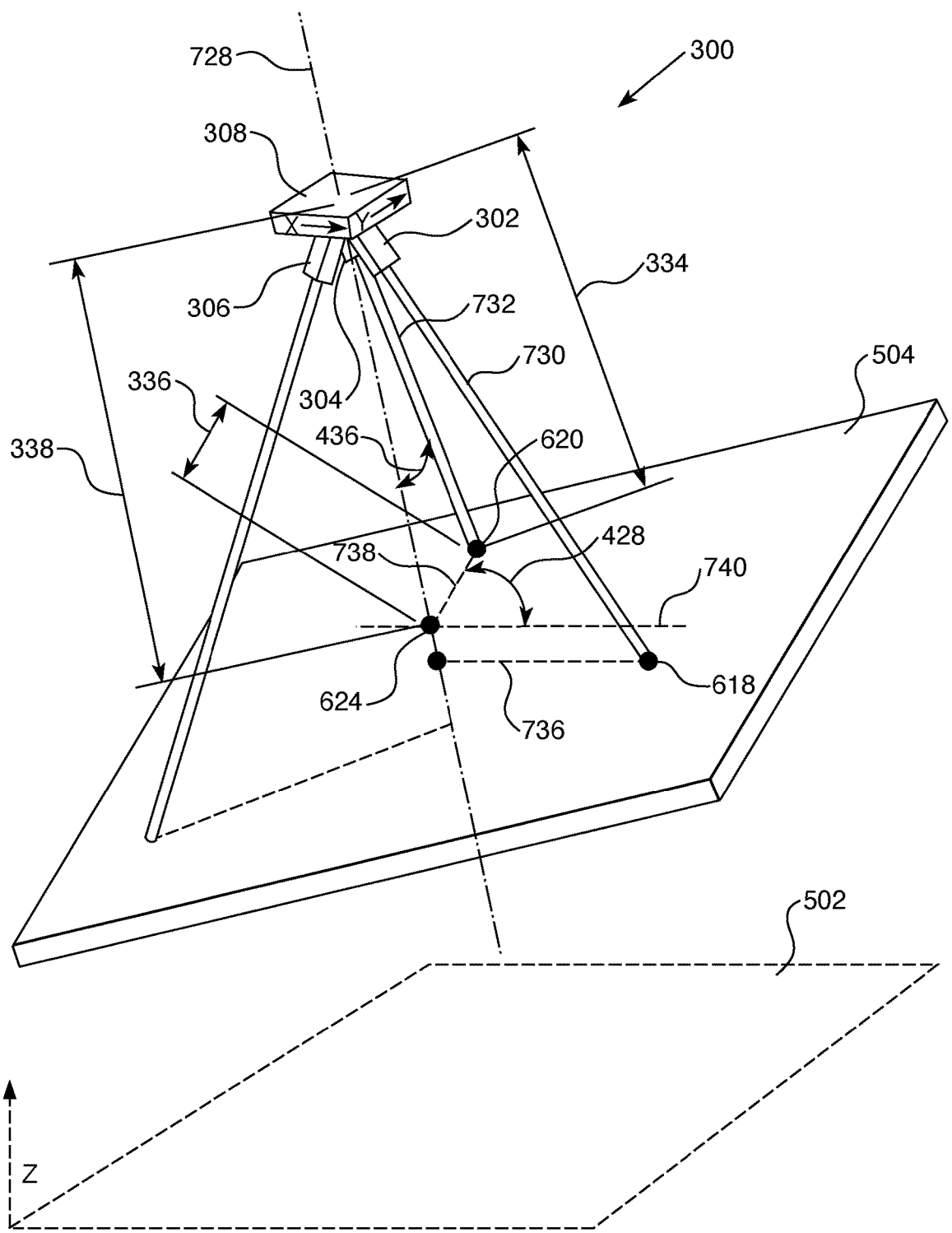

In FIG. 3D, line 738 runs perpendicular from centerline 728 at point 624 to sensor beam line 732 at point 620 on plane 504. The distance 334 is the distance from the device 300 to the point 620, as measured by the distance sensor 304. As discussed previously, the angle 436 between line 732 and centerline 728 is 30 degrees.

Line 740 intersects line 728 at point 624 and is parallel to line 736 (parallel to device x-axis). As discussed above, angle 428 is the angle between line 740 and line 738, which is 120 degrees.

Distance 336 is the distance along line 738 between point 624 and point 620. Distance 338 is the distance along line 728 between the device and point 624 and is the z-component of point 620.

Since line 738 is perpendicular to centerline 728, the angle between centerline 728 and line 738 is 90 degrees (a right angle). Looking at the right triangle formed by line 738, line 728, and line 732 and knowing the distance 334 measured by the sensor 304, distance 336 and distance 338 can be calculated.

$$\text{distance } 336 = \sin(\text{angle } 436) * \text{distance } 334 = \quad \text{equation 968}$$

$$\sin(30 \text{ degrees}) * \text{distance } 334 = .5 * \text{distance } 334$$

$$\text{distance } 338 = \cos(\text{angle } 436) * \text{distance } 334 = \quad \text{equation 970}$$

$$\cos(30 \text{ degrees}) * \text{distance } 334 = .87 * \text{distance } 334$$

Line 738 is at angle 428 from line 740 (parallel to line 736 and the x-axis) which is 120 degrees. The x-y-z components of point 620 are:

$x\text{-component} = \cos(\text{angle } 428) * \text{distance } 336 =$ $\cos(120 \text{ degrees}) * \text{distance } 336 = -.5 * \text{distance } 336$ $y\text{-component} = \sin(\text{angle } 428) * \text{distance } 336 =$ $\sin(120 \text{ degrees}) * \text{distance } 336 = .87 * \text{distance } 336$ $z\text{-component} = \text{distance } 338$ For point 620 x,y,z: P(−0.5*distance 336, 0.87*distance 336, distance 338). Substituting values for distance 336 from equation 968 and distance 338 from equation 970:

$P(-.5 * .5 * \text{distance } 334, .87 * .5 * \text{distance } 334, .87 * \text{distance } 334)$ or $P(-.25 * \text{distance } 334, .435 * \text{distance } 334, .87 * \text{distance } 334)$

| | |
|---|---|
| $P620x = -.25 * \text{distance } 334$ | equation 972a |
| $P620y = .435 * \text{distance } 334$ | equation 972b |
| $P620z = .87 * \text{distance } 334$ | equation 972c |

Figure 3E:
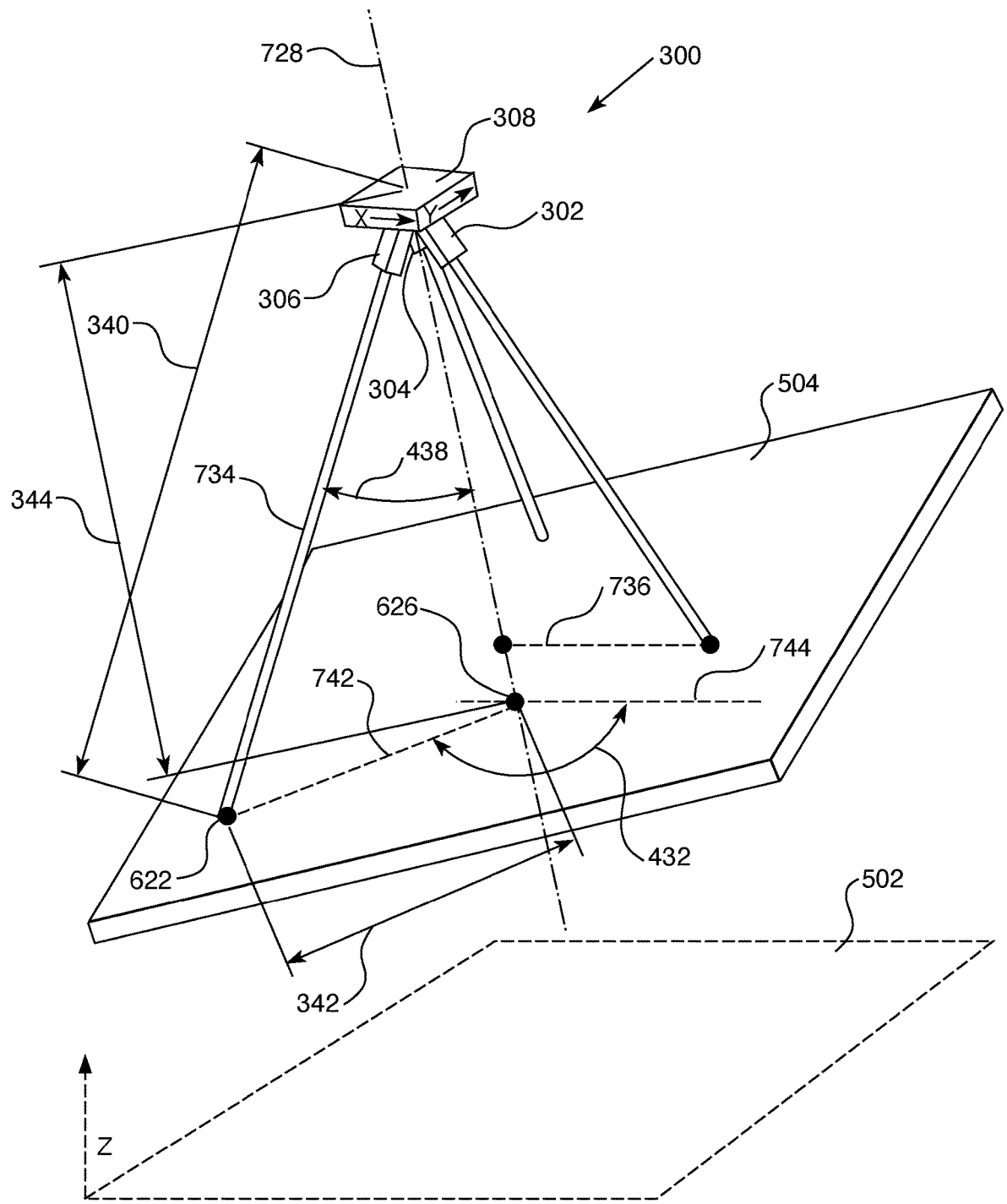

In FIG. 3E, line 742 runs perpendicular from centerline 728 at point 626 to sensor beam line 734 at point 622 on plane 504. The distance 340 is the distance from the device 300 to point 622, as measured by the distance sensor 306. The angle 438 between line 734 and centerline 728 is 30 degrees as noted before (in FIG. 3A).

Line 744 intersects line 728 at point 626 and is parallel to line 736 (parallel to device x-axis). Angle 432 is the angle between line 744 and line 742 which is 120 degrees as noted before (in FIG. 3A).

Distance 342 is the distance along line 742 between point 626 and point 622. Distance 344 is the distance along line 728 between the device 300 and point 626 and is the z-component of point 622. Since line 742 is perpendicular to centerline 728, the angle between centerline 728 and line 742 is 90 degrees (a right angle). Looking at the right triangle formed by line 742, line 728, and line 734 and knowing the distance 340 measured by distance sensor 306, distance 342 and distance 344 can be calculated.

$\text{distance } 342 = \sin(\text{angle } 438) * \text{distance } 340 =$ equation 974

$\sin(30 \text{ degrees}) * \text{distance } 340 = .5 * \text{distance } 340$ $\text{distance } 344 = \cos(\text{angle } 438) * \text{distance } 340 =$ equation 976

$\cos(30 \text{ degrees}) * \text{distance } 340 = .866 * \text{distance } 340$

Line 742 is at angle 432 from line 744 (parallel to line 736 and the x-axis) which is 120 degrees. Angle 432 is in a negative direction from the line 744, so the horizontal x-y components of point 622 are:

$x\text{-component} = \cos(-120 \text{ degrees}) * \text{distance } 342 = -.5 * \text{distance } 342$ $y\text{-component} = \sin(-120 \text{ degrees}) * \text{distance } 342 = -.866 * \text{distance } 342$ $z\text{-component} = \text{distance } 344$ For point 622 x,y,z: P(−0.5*distance 342, −0.866*distance 342, distance 344)

Substituting values for distance 342 from equation 974 and distance 344 from equation 976:

$P(-.5 * .5 * \text{distance } 340, -.866 * .5 * \text{distance } 340, .866 * \text{distance } 340)$ or $P(-.25 * \text{distance } 340, -.434 * \text{distance } 340, .866 * \text{distance } 340)$

| | |
|---|---|
| $P622x = -.25 * \text{distance } 340$ | equation 978a |
| $P622y = -.434 * \text{distance } 340$ | equation 978b |
| $P622z = .866 * \text{distance } 340$ | equation 978c |

Now, all three points (618 in FIG. 3C, 620 in FIG. 3D, and 622 in FIG. 3F) in equations 966a, 966b, 966c, 972a, 972b, 972c, 978a, 978b, and 978c are derived using distances (328, 334, and 340) measured by the distance sensors 302, 304, 306.

Figure 3F:
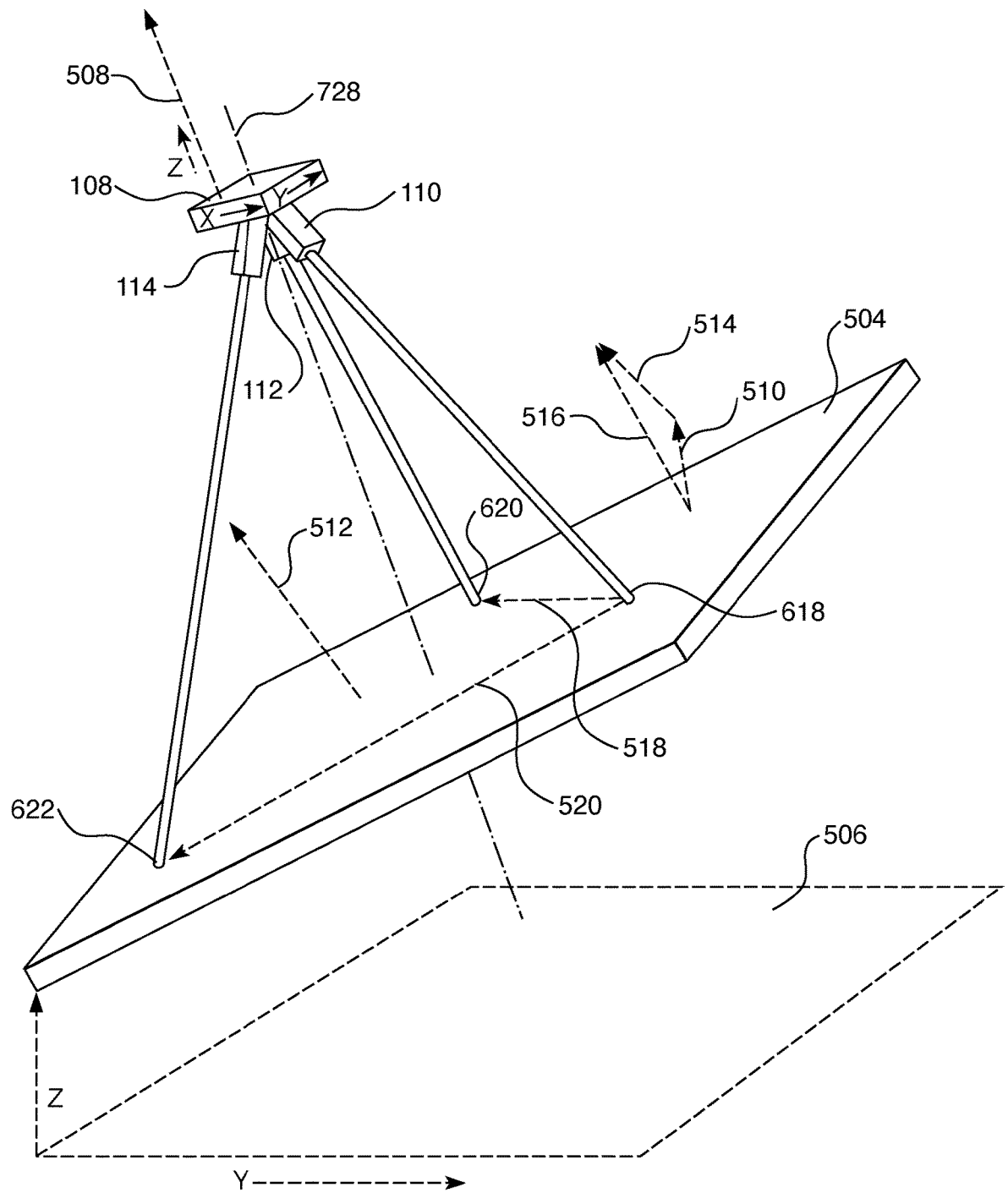

In FIG. 3F, using the three points 618, 620, and 622 known relative to the distance sensor array, two vectors 518 and 520 are calculated. Vector 518 is from point 618 to point 620 and vector 520 is from point 618 to point 622:

| | |
|---|---|
| $\vec{V518} = <a_0 \hat{i} + b_0 \hat{j} + c_0 \hat{k}> =$ | equation 980 |
| $<P620x - P618x, P620y - P618y, P620z - P618z>$ | |
| $a_0 = P620x - P618x$ | equation 982 |
| $b_0 = P620y - P618y$ | equation 984 |
| $c_0 = P620z - P618z$ | equation 986 |
| $\vec{V520} = <a_1 \hat{i} + b_1 \hat{j} + c_1 \hat{k}> =$ | equation 988 |
| $<P622x - P618x, P622y - P618y, P622z - P618z>$ | |
| $a_1 = P622x - P618x$ | equation 990 |
| $b_1 = P622y - P618y$ | equation 992 |
| $c_1 = P622z - P618z$ | equation 994 |

With the two vectors 518 and 520, the normal vector 512, which represents the tilt of plane 504 relative to the distance sensor array (sensor 302, sensor 304, and sensor 306), can be calculated using the cross product of the two vectors.

$\vec{V512} = <a_2 \hat{i} + b_2 \hat{j} + c_2 \hat{k}> = \vec{V518} \times \vec{V520} =$ equation 996

$\begin{bmatrix} \hat{i} & \hat{j} & \hat{k} \\ P620x - P618x & P620y - 618y & P620z - P618z \\ P622x - P618x & P622y - P618y & P622z - P618z \end{bmatrix} =$ $<(((P620y - P618y) * |(P622z - P618z)) -$ $((P620z - P618z) * (P622y - P618y))) \hat{i},$ $(((P620z - P618z) * (P622x - P618x)) -$ $((P620x - P618x) * (P622z - P618z))) \hat{j},$ $(((P620x - P618x) * (P622y - P618y)) -$ $((P620y - P618y) * (P622x - P618x))) \hat{k}>$ Now, breaking out the individual x, y, z factors:

$$a_2 = ((P620y - P618y)*(P622z - P618z)) - \\ ((P620z - P618z)*(P622y - P618y))$$ equation 998

$$b_2 = ((P620z - P618z)*(P622x - P618x)) - \\ ((P620x - P618x)*(P622z - P618z))$$ equation 1000

$$c_2 = ((P620x - P618x)*(P622y - P618y)) - \\ ((P620y - P618y)*(P622x - P618x))$$ equation 1002

Now calculate the magnitude of vector 512:

$$|\vec{V512}| = \sqrt{a_2^2 + b_2^2 + c_2^2}$$ equation 1004

The unit vector for vector 512 will be Vector 514 defined as:

$$\vec{V514} = <a_3\hat{\imath} + b_3\hat{\jmath} + c_3\hat{k}>$$ equation 1006

Now calculate unit vector 514 by dividing each vector component by the vector magnitude:

$$\vec{V514} = <a_2/|\vec{V512}|, b_2/|\vec{V512}|, c_2/|\vec{V512}|>$$ equation 1008

$$a_3 = a_2/|\vec{V512}|$$ equation 1010

Substituting value for $a_2$ in equation 998:

$$a_3 = ((P620y - P618y)*(P622z - P618z)) - \\ ((P620z - P618z)*(P622y - P618y))/|\vec{V512}|$$ equation 1012

$$b_3 = b_2/|\vec{V512}|$$

Substituting value for $b_2$ in equation 1000:

$$b_3 = ((P620z - P618z)*(P622x - P618x)) - \\ ((P620x - P618x)*(P622z - P618z))/|\vec{V512}|$$ equation 1014

$$c_3 = c_2/|\vec{V512}|$$

Substituting value for $c_2$ in equation 1002:

$$c_3 = ((P620x - P618x)*(P622y - P618y)) - \\ ((P620y - P618y)*(P622x - P618x))/|\vec{V512}|$$

From equations 1010, 1012, and 1014 unit vector 514 x-factor $a_3$, unit vector 514 y-factor $b_3$, and unit vector 514 z-factor $c_3$ are now known from the distance sensor array and will used as known values in the equations below.

Now the accelerometer reading will be processed giving normal vector 508 of the accelerometer 308 x-y plane relative to plane 506. Vector 508 will be defined as:

$$\vec{V508} = <a_4\hat{\imath} + b_4\hat{\jmath} + c_4\hat{k}>$$ equation 1016 where $a_4$ is the accelerometer 308 x-axis reading, $b_4$ is the accelerometer 308 y-axis reading, and $c_4$ is the accelerometer 308 z-axis reading.

The equation for the magnitude of vector 508:

$$|\vec{V508}| = \sqrt{a_4^2 + b_4^2 + c_4^2}$$ equation 1018

The unit vector for vector 508 will be vector 510 defined as:

$$\vec{V510} = <a_5\hat{\imath} + b_5\hat{\jmath} + c_5\hat{k}>$$

Now calculate unit vector 510 by dividing each vector component by the vector magnitude:

$$\vec{V510} = <a_4/|\vec{V508}|, b_4/|\vec{V508}|, c_4/|\vec{V508}|>$$ equation 1020

$$a_5 = a_4/|\vec{V508}|$$ equation 1022

$$b_5 = b_4/|\vec{V508}|$$ equation 1024

$$c_5 = c_4/|\vec{V508}|$$ equation 1026

From equations 1022, 1024, and 1026, unit vector 510 x-factor as, unit vector 510 y-factor $b_5$, and, unit vector 510 z-factor $c_5$ are now known from the accelerometer 308 and will used as known values in the equations below.

To get the normal vector 516 for the surface plane 504 relative to level plane 506, unit vector 510 and unit vector 514 will be added. The vector 516 being solved for is represented by:

$$\vec{V516} = <a_6\hat{\imath} + b_6\hat{\jmath} + c_6\hat{k}>$$ equation 1028

Adding Vector 510 and Vector 514 by adding each of the vector components:

$$\vec{V516} = \\ |\vec{V510}| + |\vec{V514}| = <(a_5 + a_3)\hat{\imath} + (b_5 + b_3)\hat{\jmath} + (c_5 + c_3)\hat{k}>$$ equation 1030

$$a_6 = (a_5 + a_3)$$ equation 1032

$$b_6 = (b_5 + b_3)$$ equation 1034

$$c_6 = (c_5 + c_3)$$ equation 1036

$a_6$, $b_6$, and $c_6$ calculations are now known from the distance sensor array and the accelerometer readings. The values for equation 1028 being known, normal vector 516 for plane 504 is now calculated.

Again, the most unique aspects of this device 300 are that the distance sensors 302, 304, 306 are aimed at wide angle apart instead of parallel and the device approaches being a single point sensing device. The above method of calculating the ground slope is exemplary only and the invention is not limited to this calculation method. Rather, any method may be used to calculate the ground slope using the measurements obtained by the device 300.

The ground slope measurement calculated by the device 300 is displayed to the user on a display screen. FIG. 6 is an example of the information that is displayed to the user on the display screen 294. In particular, FIG. 6 shows the angle measurement and the direction of the ground slope.

Figure 4:
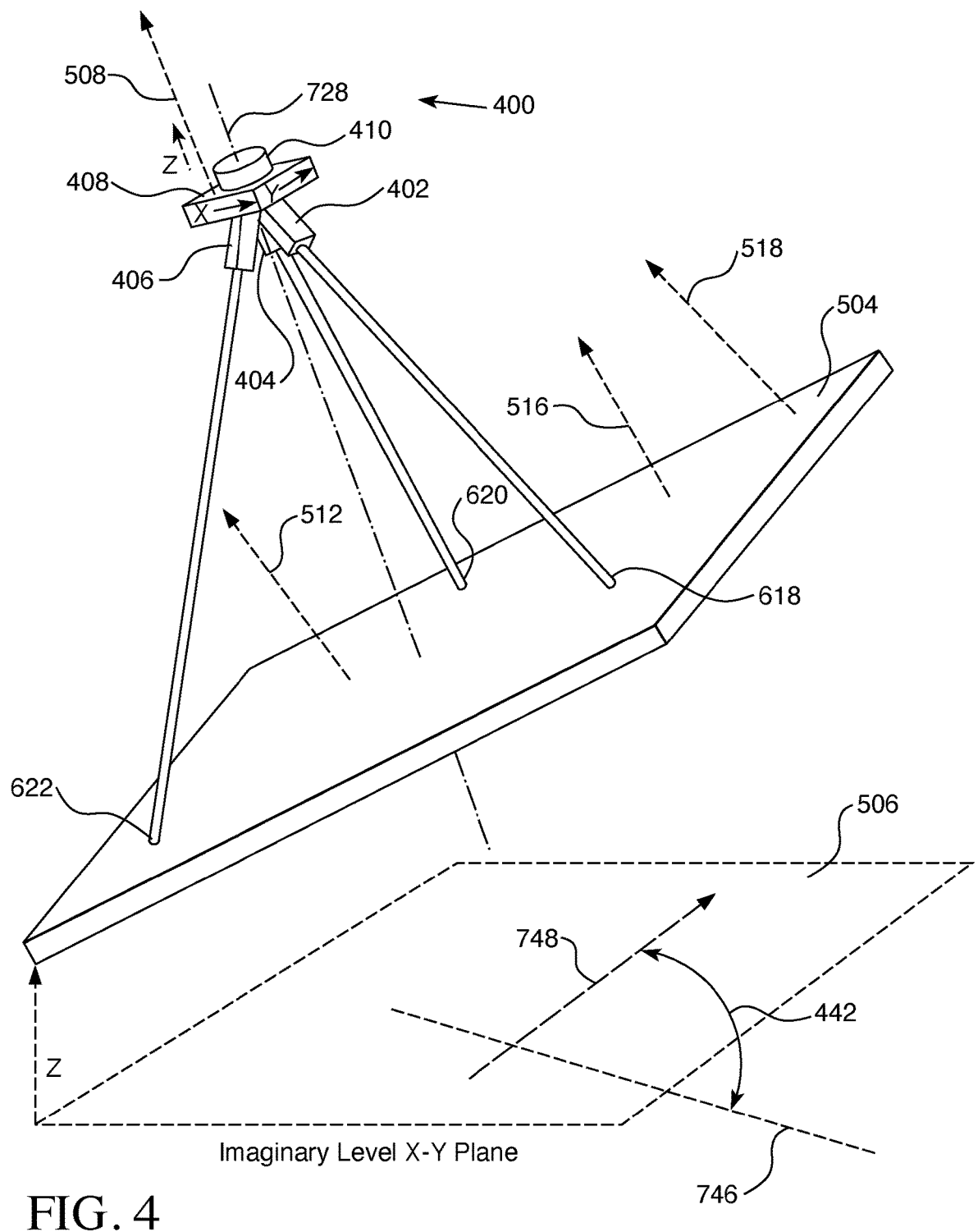
FIG. 4 illustrates a method for measuring a slope angle of a surface using a slope angle measuring device having three distance sensors and a three-axis magnetometer, in accordance with one embodiment of the present invention.

In yet another example, shown in FIG. 4, a slope measuring device 400 includes a three-axis magnetometer 410. Similar to the previous example, the slope measuring device 400 further includes a three-axis accelerometer 408 and distance sensors 402, 404, and 406. The combination of a three-axis magnetometer 410 and a three axis accelerometer 408 provides a tilt and declination compensated electronic compass. The device 400 is not limited to three distance sensors and may include 4 or more distance sensors.

The addition of a compass provides access to reading of True North with respect to the x-component of vector 516. By taking the heading of the front of the device along line 746 and rotating the normal vector 516 in an X-Y plane by that amount, a normal vector 518 to plane 504 with respect to True North line 748 in imaginary horizontal x-y plane 506 can be calculated. In this example, the normal vector 516 for plane 504 is in relation to the direction the device 400 is pointed instead of True North.

The angle 442 is the heading of the tilt and declination compensated compass. If heading angle 442 is greater than 180 degrees, angle 442 will be a minus value by subtracting 360 degrees. The normal vector 516 is rotated in the x-y plane by angle 442 using a rotation matrix which will give normal vector 518 to the plane 504 in global coordinates. The rotation matrix will be around the z-axis, so only the x-y plane will be affected.

The vector being solved for is represented by:

$$\vec{V518} = <a_7\hat{\imath} + b_7\hat{\jmath} + c_7\hat{k}> \quad \text{equation 1046}$$

From equation 1028 above where:

$$\vec{V516} = <a_6\hat{\imath} + b_6\hat{\jmath} + c_6\hat{k}>$$

$a_6$, $b_6$, and $c_6$ are known from equation 1032, equation 1034, and equation 1036 respectively. This is the rotation matrix calculation:

$$\vec{V518} = \begin{bmatrix} \cos(\text{Angle } 442) & -\sin(\text{Angle } 442) & 0 \\ \sin(\text{Angle } 442) & \cos(\text{Angle } 442) & 0 \\ 0 & 0 & 1 \end{bmatrix} \cdot \begin{bmatrix} a_6 \\ b_6 \\ c_6 \end{bmatrix} = \quad \text{equation 1048}$$

$$\begin{bmatrix} \cos(\text{Angle } 442)*a_6 - \sin(\text{Angle } 442)*b_6 + 0 \\ \sin(\text{Angle } 442)*a_6 + \cos(\text{Angle } 442)*b_6 + 0 \\ 0 + 0 + c_6 \end{bmatrix} =$$

$$\begin{bmatrix} \cos(\text{Angle } 442)*a_6 - \sin(\text{Angle } 442)*b_6 \\ \sin(\text{Angle } 442)*a_6 + \cos(\text{Angle } 442)*b_6 \\ c_6 \end{bmatrix}$$

$$a_7 = \cos(\text{Angle } 442)*a_6 - \sin(\text{Angle } 442)*b_6 \quad \text{equation 1050}$$

-continued $$b_7 = \sin(\text{Angle } 442)*a_6 + \cos(\text{Angle } 442)*b_6 \quad \text{equation 1052}$$

$$c_7 = c_6 \quad \text{equation 1054}$$

The normal vector 518 for the surface plane 504 is now calculated in relation to True North.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A device for measuring a 3-dimensional slope of a surface, the device comprising:
   a tilt sensor;
   three distance sensors coupled to the tilt sensor, wherein each one of the distance sensors is coupled to a center point of the device and extends from the center point away from the other distance sensors such that the three distance sensors are configured at an angle relative to each other, and wherein the angle between the distance sensors is between 40 and 70 degrees;

a device centerline extending from the device to the surface; and a processor configured for calculating the slope of the surface based on measurements provided by the tilt sensor and the three distance sensors, wherein each of the three distance sensors is aimed downward at the surface.

2. The device of claim 1, wherein the tilt sensor is an inclinometer.

3. The device of claim 1, wherein the three sensors are laser distance sensors, LED time-of-flight sensors, or IR distance sensors.

4. The device of claim 1, further comprising a display configured for displaying the slope calculated by the processor.

5. The device of claim 1, wherein the device is sized and shaped to be held in a user's hand.

6. The device of claim 1, wherein the device further comprises a three-axis magnetometer.

7. The device of claim 1, wherein the tilt sensor is a three-axis accelerometer.

8. The device of claim 1, wherein the tilt sensor is a bubble level.

9. The device of claim 1, wherein each of the three distance sensors is aimed downward at the surface at an aiming angle of 30 degrees from the device centerline.

10. A method for calculating the 3-dimensional slope of a surface comprising:
    providing a device comprising:
        a first distance sensor;
        a second distance sensor;
        a third distance sensor;
        a device centerline;
        a tilt sensor;
        a processor;
    holding the device in one's hand;
    aiming each the first distance sensor, the second distance sensor, and the third distance sensor downward at the surface at an aiming angle relative to a device centerline;
    emitting a first distance sensor beam line in the form of light from the first distance sensor to the surface and thereby calculating a first sensor distance from the first distance sensor to the surface;
    emitting a second distance sensor beam line in the form of light from the second distance sensor to the surface and thereby calculating a second sensor distance from the second distance sensor to the surface;
    emitting a third distance sensor beam line in the form of light from the third distance sensor to the surface and thereby calculating a third sensor distance from the second distance sensor to the surface;
    using the tilt sensor to determine a normal vector, wherein the normal vector is parallel to the device centerline; and
    using the processor to calculate the 3-dimensional slope of the surface using the first sensor distance, the second sensor distance, the third sensor distance, the aiming angle, and the normal vector,
    wherein the first distance sensor, the second distance sensor, and the third distance sensor are coupled to a center point of the device and extend from the center point away from each other at a distance sensor angle relative to each other.

11. The method of claim 10, wherein the aiming angle is 30 degrees.

12. The method of claim 10, wherein the distance sensor angle is between 40 and 70 degrees.

13. The method of claim 10, wherein the first distance sensor, the second distance sensor, and the third distance sensor are laser distance sensors, LED time-of-flight sensors, or IR distance sensors.

14. The method of claim 10, wherein the device further comprises a display configured for displaying the slope calculated by the processor.

15. The method of claim 10, wherein the tilt sensor is a three-axis accelerometer.

16. The method of claim 10, wherein the tilt sensor is a bubble level.

17. The method of claim 10, further comprising standing on the surface before aiming each the first distance sensor, the second distance sensor, and the third distance sensor downward at the surface at the aiming angle relative to the device centerline.

* * * * *